United States Patent Office 3,514,489
Patented May 26, 1970

3,514,489
SEC-BUTYL CYCLOHEXANE CARBOXALDEHYDES
Seymour Lemberg, Elizabeth, N.J., assignor to International Flavors & Fragrances, Inc., New York, N.Y., a corporation of New York
No Drawing. Filed Sept. 5, 1967, Ser. No. 665,225
Int. Cl. C07c 47/28, 47/38
U.S. Cl. 260—598                                     5 Claims

ABSTRACT OF THE DISCLOSURE

Novel sec-butyl cyclohexane derivatives including 5-(3-buten-2-yl)-3-cyclohexene carboxaldehyde, the corresponding alcohol, and derivatives of these and processes for preparing such materials from methyl heptatriene. These compounds are olfactory agents.

BACKGROUND OF THE INVENTION

This invention provides novel materials possessing fragrance properties which are of particular value in the perfume and essential oil industry, as well as processes for preparing such materials.

THE INVENTION

This invention provides novel compositions and components together with novel processes and steps of processes, specific embodiments of which are described hereinafter by way of example and in accordance with which it is now preferred to practice the invention.

Briefly, the novel materials of this invention can be considered to be derivatives of sec-butylcyclohexane having the structural formula:

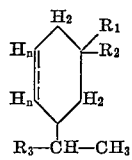

where $R_1$ is hydrogen or lower alkyl; $R_2$ is

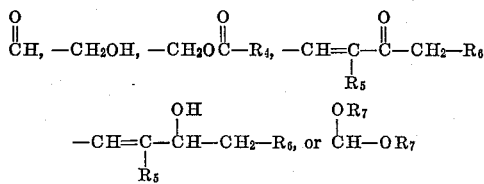

$R_3$ is ethyl or vinyl; $R_4$, $R_5$, and $R_6$ are hydrogen or lower alkyl; $R_7$ is lower alkyl; $n$ is one or two; and the dashed line indicates that a single bond is present when $n$ is two and a double bond is present when $n$ is one. They are prepared by the reaction of 5-methyl-1,3,6-heptatriene with an unsaturated aldehyde. In some aspects of this invention the resulting products are further reacted to obtain other useful materials. Thus, both saturated and unsaturated aldehydes and alcohols are prepared by suitable techniques, and esters of the alcohols are also obtained.

Thus, this invention provides 5-(3-buten-2-yl)-3-cyclohexene carboxaldehyde having the structural formula:

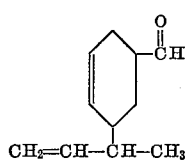

This material has a boiling point of 72° C. at 3.0 mm. Hg, an $n_D^{20}$ of 1.4890–1.4892, and a good green-twiggy odor which is relatively long-lasting and dries out cleanly.

A second material according to this invention is 5-(3-buten-2-yl)-1-methyl-3-cyclohexene carboxaldehyde having the formula:

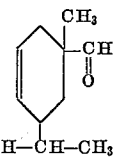

This material has a boiling point of 45° C. at 0.20 mm. Hg, an $n_D^{20}$ of 1.4907–1.4909, and a camphoraceous, herbaceous piney odor.

Another carboxaldehyde produced according to the present invention is a 5-sec-butyl-3-cyclohexene carboxaldehyde having the formula:

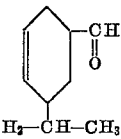

having an $n_D^{20}$ of 1.4730–1.4745. It has a powerful rosy, green, floral odor.

Another novel material provided by this invention is 3-sec-butyl-cyclohexane carboxaldehyde having the structural formula:

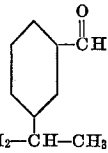

This material has a boiling point of 51–54° C. at 0.3 mm. Hg, an $n_D^{20}$ of 1.4683–1.4693, and a powerful "green" odor.

Another fragrance material produced according to the present invention is 5-(3-buten-2-yl)-3-cyclohexene methanol having the structural formula:

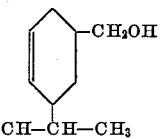

This material has a boiling point of 82° C. at 0.6 mm. Hg, an $n_D^{20}$ of 1.4899 and a smooth, clean rose odor.

Another perfume material prepared according to the present invention is 5-sec-butyl-3-cyclohexene methanol having the structural formula:

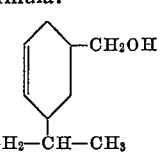

This material has a boiling point of 86° C. at 0.5 mm. Hg, an $n_D^{20}$ of 1.4945, and a very fine floral rose-peony odor with a minty quality.

Another novel material provided by the present invention is 3-sec-butylcyclohexane methanol having the formula:

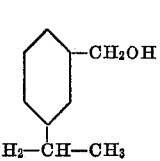

and a boiling point of 79° C. This liquid has an $n_D^{20}$ of 1.4745 and a very fine floral rose-peony odor with a minty quality.

Another novel material obtained according to this invention is the acetate of 5-(3-buten-2-yl)-3-cyclohexene methanol having the structural formula:

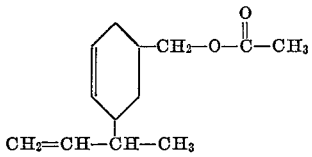

This material has a boiling point of 63° C. at 0.25 mm. Hg, and an $n_D^{20}$ of 1.4772.

Another material according to this invention is a mixture of 1-[5-(3-buten-2-yl)-3-cyclohexenyl]-1-penten-3-one having the structure

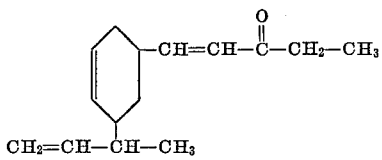

and 3-methyl-4-[5-(3-buten - 2 - yl)-3-cyclohexenyl]-3-buten-2-one having the structural formula:

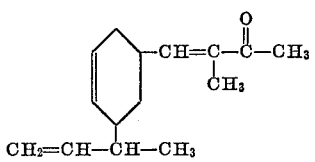

This mixture of materials has a boiling range of 105–110° C. at 0.9 mm. Hg, an $n_D^{20}$ range of 1.4957–1.5055, and a sour, woody, twiggy odor.

Another composition of this invention is a mixture of 1-[5-(3-buten - 2 - yl)-3-cyclohexenyl]-1-penten-3-ol having the structural formula:

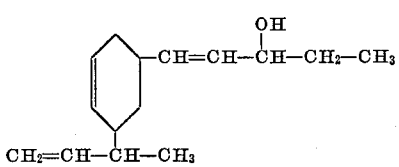

and 3-methyl-4-[5-(3-buten-2-yl) - 3 - cyclohexenyl]-3-buten-2-ol having the structural formula:

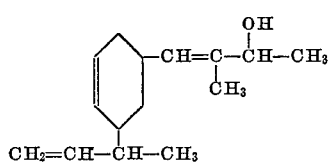

This mixture has a boiling point of 105–106° C. at 0.7 mm. Hg, and a long-lasting fruity, floral rose odor.

Another novel material produced according to this invention is 5-(3-buten-2-yl)-3-cyclohexene carboxaldehyde dimethyl acetal having the formula:

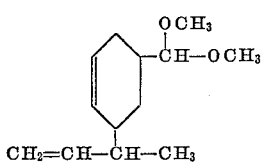

It is a liquid having a boiling point of about 118–120° C. at 0.2 mm. Hg.

The process of this invention to produce the novel materials disclosed herein involves the reaction of $\alpha,\beta$-unsaturated aldehydes with alkyl-substituted heptatriene, preferably methyl-substituted heptatriene such as 5-methyl - 1,3,6 - heptatriene to produce an alkenyl-cyclohexene carboxaldehyde. While the heptatriene can be utilized in the commercially available form at about 80% purity, it is especially preferred in carrying out the process of this invention that the material be distilled substantially to 100% purity before use. If desired, this distillation can be carried out in the presence of an antioxidant to suppress any tendency for the heptatriene to polymerize. All parts, proportions, percentages, and ratios herein are by weight unless otherwise indicated.

The preferred unsaturated aldehydes for use in this invention are propenals such as acrolein and alkyl acroleins, especially lower 2-alkyl acroeins such as methacroein and the like. As used herein, "lower alkyl" incudes from one to six carbon atoms. The ratio of heptatriene to unsaturated adehyde can be varied in the reaction mixture, and equimolar quantities are preferred.

The reaction of the heptatriene and unsaturated aldehyde to provide an alkenyl cyclohexene carboxaldehyde is carried out by admixing the materials, together with an antioxidant if desired, and heating the mixture to a temperature sufficient to permit reaction. Generally, it is desirable to carry out the reaction at a temperature in the range of from about 70° to about 110° C. It has been found that optimum results are usually obtained when the temperature is maintained in the preferred range of 80°–100° C.

The time required to carry out the reaction of the heptatriene and aldehyde varies inversely with the temperature. Temperatures above 100° C. tend to increase polymerization of the reactants and lower the yield of useful products, whereas too low a temperature results in unduly long reaction times. Reaction times on the order of about 6–16 hours can be used, and it is preferred to carry out the reaction for from about 8 to about 14 hours. A long reaction time may cause polymerization of the products of this invention, and shorter reaction times result in lower percent conversion of reactants.

The reaction can be carried out at sub- or super-atmospheric pressures, and it is especially preferred to carry out the reaction at atmospheric pressure. If desired, an inert vehicle can be used in the reaction mixture. Exemplary of such an inert vehicle is paraffin oil. It is generally preferred to carry the reaction out in the absence of any vehicle.

It is preferred to have an antioxidant material present during the reaction. It has been found that antioxidants such as butylated hydroxy anisole and butylated hydroxy toluene substantially prevent either the unsaturated aldehyde or the heptatriene from polymerizing during the reaction. Hydroquinone is a desirable antioxidant.

It will be understood from the present disclosure that certain ketones can also be reacted with the heptatriene under similar conditions to provide other materials, and the vinyl ketones are especially adapted to produce acyl derivatives of cyclohexene. Thus, the reaction of methyl vinyl ketone with the heptatriene provides 3-(3-buten-2-yl)-5-acetyl-1-cyclohexene. Other acyl derivatives are similarly prepared from alkyl vinyl ketones, especially the lower alkyl vinyl ketones.

The alcohol derivatives of the butenylcyclohexene carboxaldehydes obtained by the foregoing process, for example, a 3-butenylcyclohexene methanol, are produced by selective hydrogenation of the aldehyde. Such selective hydrogenation can be carried out by adding the aldehyde to an ether type vehicle with a suitable reducing agent. The ethereal solvent can comprise cyclic ethers such as tetrahydrofuran or aliphatic ethers such as diethyl ether or diethylene glycol dimethyl ether. The preferred reducing agents are metallic hydrides such as sodium borohydride and lithium aluminum hydride and organo-metallic alcoholates or salts such as aluminum isopropoxide.

The reaction is carried out at a temperature sufficient to dissolve substantial quantities of the reducing agent in the ether vehicle, and the upper temperature is determined by the vehicle and pressure under which the reaction is carried out. While the reaction can be carried out at sub- or super-atmospheric pressures, it is preferred to carry out the reduction at atmospheric pressure. When a super-atmospheric pressure system is utilized for the reduction, higher temperatures can be employed. It is preferred to carry out the reduction of the aldehyde at 20°–30° C.

The acetals of the carboxaldehydes according to the present invention are prepared by reacting the aldehyde with an excess of aliphatic alcohol in the presence of an acidic material to catalyze the reaction. The acetal-forming reaction is suitably carried out at temperatures on the order of 60–160° C. The lower aliphatic alcohols containing from one to about six carbon atoms are preferred, and the reaction can suitably be carried out at the reflux temperature of the alcohol-catalyst system. The catalyst can be an inorganic or organic acid, and sulfonic acids, especialy aromatic sulfonic acids such as toluene sulfonic, give good results. Thus, 5-(3-buten-2-yl)-3-cyclohexene carboxaldehyde dimethyl acetal can be prepared using methanol and p-toluene sulfonic acid. The other dialkyl acetals are similarly prepared.

The butylcyclohexene derivatives can, in turn, be prepared by hydrogenation of the butenyl cyclohexene derivatives and further hydrogenation under similar conditions will produce the butylcyclohexyl materials. The hydrogenation to produce the butyl material from the butenyl derivative is preferably carried out in the presence of a vehicle. Prefered vehicles are alcohols, preferably lower alcohols having from 1 to about 4 carbon atoms. An especially preferred vehicle is ethanol.

The hydrogenation to produce butyl derivatives from butenyl materials is carried out with gaseous hydrogen in the presence of a hydrogenation catalyst. Suitable hydrogenation catalysts are platinum oxide, nickel, palladium, and the like. The hydrogenation is carried out at pressures from 0 to about 200 p.s.i.g. and temperatures ranging from about 25° C. to about 200° C. Temperatures at the lower end of the range, namely, 25–30° C. are preferred. The cyclohexenyl ring is similarly hydrogenated, but temperatures of the order of 100° C. are prefered for this hydrogenation.

The alcoholic derivatives can be esterified either before or after hydrogenation to produce the esters. For example, the acetic acid esters can be prepared by reacting acetic anhydride or acetyl chloride with the alcohols, desirably in the presence of an acid catalyst such as phosphoric acid. The propyl esters can similarly be produced by the use of propionyl chloride or propionic anhydride. When carried out with the carboxylic acid anhydrides or acyl halides, the esterification can be carried out conveniently at reflux temperatures.

The butenone and pentenone derivatives of the carboxaldehyde are prepared by reacting the cyclohexenyl carboxaldehyde with a ketone, desirably methyl ethyl ketone. This reaction is preferably carried out in a base-catalyzed system. Such a system desirably contains a vehicle, preferably an alcohol such as methanol, and a strong base, desirably potassium hydroxide. The reactants are mixed and the reaction is conducted at temperatures of the order of 10°–50° C. Temperatures of the order of 20°–30° C. are preferred. The ketone utilized should be present in at least equimolar quantities and is preferably in excess.

The butenone and pentenone derivatives can be converted to the corresponding alcohols by reduction, as set forth above for conversion of the cyclohexenyl carboxaldehyde to the cyclohexenyl methanol. If desired, the esters of these alcohols can then be formed as set forth above.

The compounds of this invention generally possess fruity, floral, rose-like odors. These properties make the products of this invention particularly useful in the preparation of perfumes and perfume materials. As disclosed above and further set forth by way of example hereinafter, a wide variety of fragrance materials can be obtained according to the processes of this invention.

The following examples are given to illustrate embodiments of the invention as it is presently preferred to practice it. It will be understood that these examples are illustrative, and the invention is not to be considered as restricted thereto except as indicated in the appended claims.

EXAMPLE I

Thirteen hundred and fifty grams of substantially pure 5-methyl-1,3,6-heptatriene, 700 grams of acrolein, and 50 grams of hydroquinone are introduced into an autoclave and the mixture is maintained at 100° C. for 8 hours to form a reaction product. The reaction product so obtained is distilled in a fractionating column.

There is obtained 1192 grams of 5-(3-buten-2-yl)-3-cyclohexene carboxaldehyde having the structural formula given above. This material is a clear liquid having a boiling point of 72° C. at 3.0 mm. Hg and an $n_D^{20}$ of of 1.4890–1.4892. Gas-liquid chromatographic (GLC) analysis shows that two components are present in equal amounts. Spectroscopic analyses utilizing nuclear magnetic resonance (NMR), mass, and infrared (I.R.) methods show that these are the cis and trans isomers of 5-(3-butene-2-yl)-3-cyclohexene carboxaldehyde. This material has a good green-twiggy odor which is long-lasting.

EXAMPLE II

About 1080 grams of 5-methyl-1,3,6-heptatriene, 700 grams of methacrolein, and 50 grams of hydroquinone are introduced into an autoclave. The mixture is heated at 73° C. for 12 hours and the product is fractionally distilled to obtain 1450 grams of a clear liquid.

This clear liquid material is 5-(3-buten-2-yl)-1-methyl-cyclohexene carboxaldehyde having the structural formula shown above. This liquid has a boiling point of 45° C. at 0.20 mm. Hg and an $n_D^{20}$ of 1.4907–1.4909. NMR and mass spectra support the given structure. The material has a camphoraceous, herbaceous piney odor.

EXAMPLE III

A hydrogenation unit is charged with 166 grams of the product of Example I, 100 grams of ethanol, and 8 grams of Raney nickel. The flash is purged four times with hydrogen, and the conents are then hydrogenated at a pressure of 14–45 p.s.i.g. and a temperature of 25–30° C. for slightly over 4 hours. The product is filtered, the alcohol is recovered, and the product is distilled under vacuum. The product is chiefly 5-sec-butyl-3-cyclohexene carboxaldehyde. It is a liquid having an $n_D^{20}$ of 1.4730–1.4745. It has a powerful rosy, green, floral odor.

EXAMPLE IV

One hundred grams of the material produced in Example I is dissolved in 200 cc. of ethanol, and 2 grams of $PtO_2$ is added as a catalyst. The temperature of the mixture is raised to 50° C. and 2 moles of hydrogen is added to, and absorbed by, the carboxaldehyde. The catalyst is then removed by filtration.

The filtrate is distilled to obtain 95 grams of 3-sec-butylcyclohexane carboxaldehyde having the structural formula shown above. This material has a boiling point of 51–54° C. at 0.3 mm. Hg, and an $n_D^{20}$ of 1.4683–1.4693. NMR analysis shows no olefinic unsaturation and supports the structure set forth above. This material has a powerful "green" odor.

EXAMPLE V

A mixture of 250 grams of water, 206 grams of sodium hydroxide, 62 grams (1.65 moles) of sodium borohydride and 1500 ml. of methyl alcohol is prepared, and 247 grams of the product of Example I dissolved in 500 ml. of methanol is added while the borohydride-containing mixture is maintained at room temperature. The addition is completed within one hour, and the mass is then acidified with 30% aqueous hydrochloric acid. The methyl alcohol is stripped from the acidified mixture, and the remainder of the material is fractionated to produce 170 grams of material.

The 5-(3-buten-2-yl)-3-cyclohexene methanol so produced has the structure set forth above. The material has a boiling point of 82° C. at 0.6 mm. Hg and an $n_D^{20}$ of 1.4999. NMR and I.R. spectroscopy support the structure given. The material has an excellent smooth clean rose odor.

EXAMPLE VI

The product of Example V in the amount of 75 grams is dissolved in 76 grams of ethanol containing 0.76 gram of Adams catalyst (PtO₂). One mole of hydrogen is added at 25–40° C. and a pressure of 25–40 p.s.i.g. After the mole of hydrogen has been absorbed by the material, the catalyst is removed by filtration, the alcohol is recovered, and the hydrogenated material is fractionally distilled to provide 71 grams of product.

This product is 5-sec-butyl-3-cyclohexene methanol having the structural formula given above, a boiling point of 86° C. at 0.5 mm. Hg, and an $n_D^{20}$ of 1.4945. The structure given above is confirmed by I.R. and NMR spectroscopy. The material has a very fine floral rose-peony fragrance with a minty quality.

EXAMPLE VII

Fifty grams of 5-(3-buten-2-yl)-3-cyclohexene methanol prepared in Example V is dissolved in 50 grams of ethyl alcohol and hydrogenated atmospherically in the presence of platinum oxide (0.5 gram) until 2 moles of hydrogen is adsorbed. The temperature is maintained at 25–45° C. during the reaction. After removal of the catalyst via filtration, the ethanol is removed in vacuo, and the oil thereby obtained is fractionally distilled.

Forty-five grams of a constant boiling mixture having a B.P. of 79° C. and an $n_D^{20}$ of 1.4745 is obtained. This product is identified as 3-sec-butylcyclohexene methanol. It has a very fine floral rose-peony odor with a minty quality.

EXAMPLE VIII

One hundred grams of the product of Example V, 170 grams of acetic anhydride, and 5 grams of 85% phosphoric acid are stirred with heating at 40–45° C. for one hour. The reaction mixture is then neutralized by adding several volumes of 10% sodium bicarbonate solution and the neutralized mixture is purified by fractional distillation to yield 70 grams of clear liquid.

This clear liquid is the acetate of the alcohol of Example V with the structure as set forth above. The clear liquid has a boiling point of 63° C. at 0.25 mm. Hg, and an $n_D^{20}$ of 1.4772. The structure is confirmed by I.R., NMR, and mass spectroscopic analyses. This product has a fruity, woody and rosy odor.

EXAMPLE IX

Into a reaction flask fitted with a stirrer, cooling means, thermometer, reflux condenser, and dropping funnel is placed a mixure of 2825 grams of methanol, 150 grams of potassium hydroxide, and 1125 grams of methyl ethyl ketone. This mixture is then brought to and maintained at 28–30° C. and 340 grams of the product of Example I is added. The addition of this material takes one hour, and the material is stirred for an additional three hours at 28–30° C.

The reaction mass is then neutralized with glacial acetic acid, the methanol is removed by atmospheric distillation, and the residue is washed to neutrality with water.

The organic fraction so obtained is distilled in a 30-inch long tantalum wire column, and 240 grams of a mixture of 1-[5-(3-buten-2-yl)-3-cyclohexenyl] - 1 - pentene-3-one and 3-methyl-4-[5-(3-buten-2-yl) - 3 - cyclohexenyl]-3-butene-2-one is obtained.

This mixture boils at 105–110° C. at 0.4 mm. Hg and has an $n_D^{20}$ range of 1.4957–1.5055. GLC and NMR measurements show that a mixture of the cis and trans isomers of the above-mentioned alkenones is obtained. This mixture has a sour woody twiggy odor.

The use of other ketones, e.g. acetone and the like instead of methyl ethyl ketone, in the process of Example IX will provide yet other materials having similar fragrances.

EXAMPLE X

Into a reaction flask equipped with stirrer, thermometer, reflux condenser, dropping funnel, nitrogen purge, and heating means, is introduced a mixture of 30 ml. of dry ethyl ether and 1 gram (0.025 mole) of lithium aluminum hydride. The mass is stirred at reflux for 1.5 hours while 22 grams (0.1 mole) of the ketones produced in Example IX dissolved in 20 ml. of ethyl ether are added. Upon completion of the addition, the mixture is refluxed for three hours.

Then 10 grams of 10% aqueous hydrochloric acid is added to the mass, and the product is extracted with ethyl ether. The ether extract is washed to neutrality with sodium bicarbonate, and the ether is stripped off under atmospheric pressure. The remaining organic fraction is distilled, and 15 grams of the alcohols is obtained.

The alcohols produced are a mixture of 1-[5-(3-buten-2-yl)-3-cyclohexenyl]-1-penten-3-ol and 3-methyl-4-[5-(3-buten-2-yl)-3-cyclohexenyl]-3-butene-2-ol having the structure given above. The mixture has a boiling range of 105–106° C. at 0.7 mm. Hg and an $n_D^{20}$ of 1.5025. The structures set forth above are supported by NMR measurements. The mixture of alcohols so produced has a long-lasting fruity, floral rose odor.

EXAMPLE XI

A three-liter reaction flask equipped with stirrer, thermometer, and reflux condenser is charged with 492 grams of the product of Example I, 875 grams of methanol, and 24 grams of p-toluene-sulfonic acid. The reaction mass is then heated to reflux and maintained at reflux for 17 hours. The mass is neutralized to a phenolphthalein endpoint with sodium methylate and washed once with saturated aqueous sodium chloride.

The product so obtained is extracted five times with ethyl ether. The ether is then flash-evaporated to obtain about 2 liters of liquid which is washed twice with saturated aqueous sodium chloride. The washing medium is extracted twice with ethyl ether, and the ether is added to the main product. The entire mass is then dried over magnesium sulfate and flash-evaporated to yield 586 grams.

The material so obtained is distilled on a six-inch column and redistilled on a 24-inch Podbielniak column to yield 441 grams of product. This product is an isomeric mixture of the dimethyl acetal of 5-(3-buten-2-yl(-3-cyclohexene carboxaldehyde. It is a liquid having a boiling point of about 118–120° C. at 0.2 mm. Hg.

The materials described above are olfactory agents and can be incorporated into a wide variety of compositions which will be enhanced by various floral, twiggy fragrance notes The material produced according to this invention can be added to perfume compositions in their pure form or as mixtures of materials in fragrance-imparting compositions to give a desired fragrance character to a finished perfume material. The perfume and fragrance compositions of this invention are suitable in a wide variety of perfumed materials and can be also used to enhance, modify or reinforce natural fragrance materials.

Thus, the materials of this invention are useful as olfactory agents and fragrances. As disclosed above, the product may be employed in admixture with its isomers as obtained from the reaction mixture or the individual components may be employed alone.

The term "perfume composition" is used herein to mean a mixture of compounds, including, for example, natural oils, synthetic oils, alcohols, aldehydes, ketones, esters, lactones, and frequently hydrocarbons which are admixed so that the combined odors of the individual components produce a pleasant or desired fragrance Such perfume compositions usually contain: (a) the main note or the "bouquet" or foundation-stone of the composition; (b) modifiers which round off and accompany the main note; (c) fixatives which include odorous substances which lend a particular note to the perfume throughout all stages of evaporation, and substances which retard evaporation; and (d) top-notes which are usually low-boiling fresh-smelling materials. Such perfume compositions or the novel materials of this invention can be used in conjunction with carriers, vehicles, solvents, dispersants, emulsifiers, surface-active agents, aerosol propellants, and the like.

In perfume compositions the individaul components contribute their particular olfactory characteristics, but the overall effect of the perfume composition will be the sum of the effect of each ingredient. Thus, the individual compounds of this invention, or mixtures thereof, may be used to alter the aroma characteristics of a perfume composition, for example, by highlighting or moderating the olfactory reaction contributed by another ingredient in the composition.

The amount of mixtures of compounds of this invention which will be effective in perfume compositions depends on many factors, including the other ingredients, their amounts, and the effects which are desired. It has been found that perfume compositions containing as little as 0.1% by weight of the compounds of this invention, or even less, can be used to impart a floral odor to soaps, cosmetics and other products. The amount employed will depend on considerations of cost, nature of the end product, the effect desired on the finished product and the particular fragrance sought.

The materials disclosed herein can be used alone, in a fragrance-modifying composition, or in a perfume composition as olfactory components in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder, and the like.

EXAMPLE XII

A perfume composition is prepared by admixing the following ingredients in the indicated proportions.

| Ingredient: | Parts |
| --- | --- |
| Methyl salicylate | 20 |
| Sassafras | 30 |
| Terpinyl acetate | 350 |
| Spike lavender | 150 |
| Canaga | 60 |
| 5-(3-buten-2-yl) - 3 - cyclohexene carboxaldehyde produced in Example I | 50 |
| Dimethyl hydroquinone | 50 |
| Coumarin | 50 |
| Musk xylene | 50 |
| Oakmoss | 40 |
| Styrax resin | 100 |
| Vetivert | 50 |

The foregoing perfume is found to have a high degree of richness and persistence in its green-twiggy fragrance quality.

EXAMPLE XIII

Another perfume composition is prepared according to the following formula.

| Ingredient: | Parts |
| --- | --- |
| Citronellol | 200 |
| Phenyl ethyl alcohol | 200 |
| Geraniol palmerosa | 100 |
| 5-(3-buten-2-yl) - 3 - cyclohexene methanol produced in Example V | 100 |
| Verbena | 20 |
| Ionone | 50 |
| Clove | 10 |
| Geranium, African | 150 |
| Orris resin | 50 |
| Musk xylene | 30 |
| Santal | 50 |
| Trichlorphenyl methyl carbinyl acetate | 30 |
| Vetivert | 10 |

The foregoing perfume is found to have a high degree of richness and persistence in its rose odor.

It will be understood that the materials of Examples II to IV and VI to XI can be substituted in either of the foregoing Examples XII and XIII to obtain pleasantly scented perfume compositions having somewhat different fragrance nuances.

EXAMPLE XIV

A total of 100 g. of soap chips is mixed with 1 g. of perfume oil prepared in Example XII until a substantially homogeneous composition is obtained. It is pressed into a pleasantly scented bar having a green-twiggy scent.

EXAMPLE XV

A total of 100 g. of a detergent composition comprising 40 parts of sodium lauryl sulphate, 30 parts of a phosphate builder, and 30 parts of sodium sulphate, is mixed with 0.15 g. of the perfume oil of Example XIII until a substantially homogeneous mixture is obtained. The product is pleasantly rose-scented detergent composition.

What is claimed is:

1. A compound selected from the group consisting of 5 - (3-buten-2-yl)-3-cyclohexene carboxaldehyde; 5-(3-buten-2-yl)-1-methyl - 3 - cyclohexene carboxaldehyde; 5-sec-butyl - 3 - cyclohexene carboxaldehyde; 3-sec-butyl-cyclohexene carboxaldehyde.

2. 5-(3-buten-2-yl)-3-cyclohexene carboxaldehyde.

3. 5 - (3-buten-2-yl)-1-methyl-3-cyclohexene carboxaldehyde.

4. 5-sec-butyl-3-cyclohexene carboxaldehyde.

5. 3-sec-butylcyclohexane carboxaldehyde.

References Cited

UNITED STATES PATENTS

| 1,944,732 | 1/1934 | Diels et al. | 260—598 |
| 2,373,568 | 4/1945 | Joy et al. | 260—586 |
| 2,435,403 | 2/1948 | Morris et al. | 260—598 |
| 2,454,047 | 11/1948 | Finch et al. | 260—617 |
| 2,842,598 | 7/1958 | Kitchens | 260—598 |
| 3,067,244 | 12/1962 | Robinson et al. | 260—598 |

FOREIGN PATENTS 309,911  7/1930  Great Britain.

OTHER REFERENCES

Smith: Acrolein (1962), pp. 211–224.

BERNARD HELFIN, Primary Examiner

U.S. Cl. X.R.

260—617, 611, 586, 488; 252—522, 121